Nov. 30, 1965     L. V. ARONSON II, ETAL     3,220,450

KITCHEN APPLIANCE

Filed Dec. 26, 1961     4 Sheets-Sheet 1

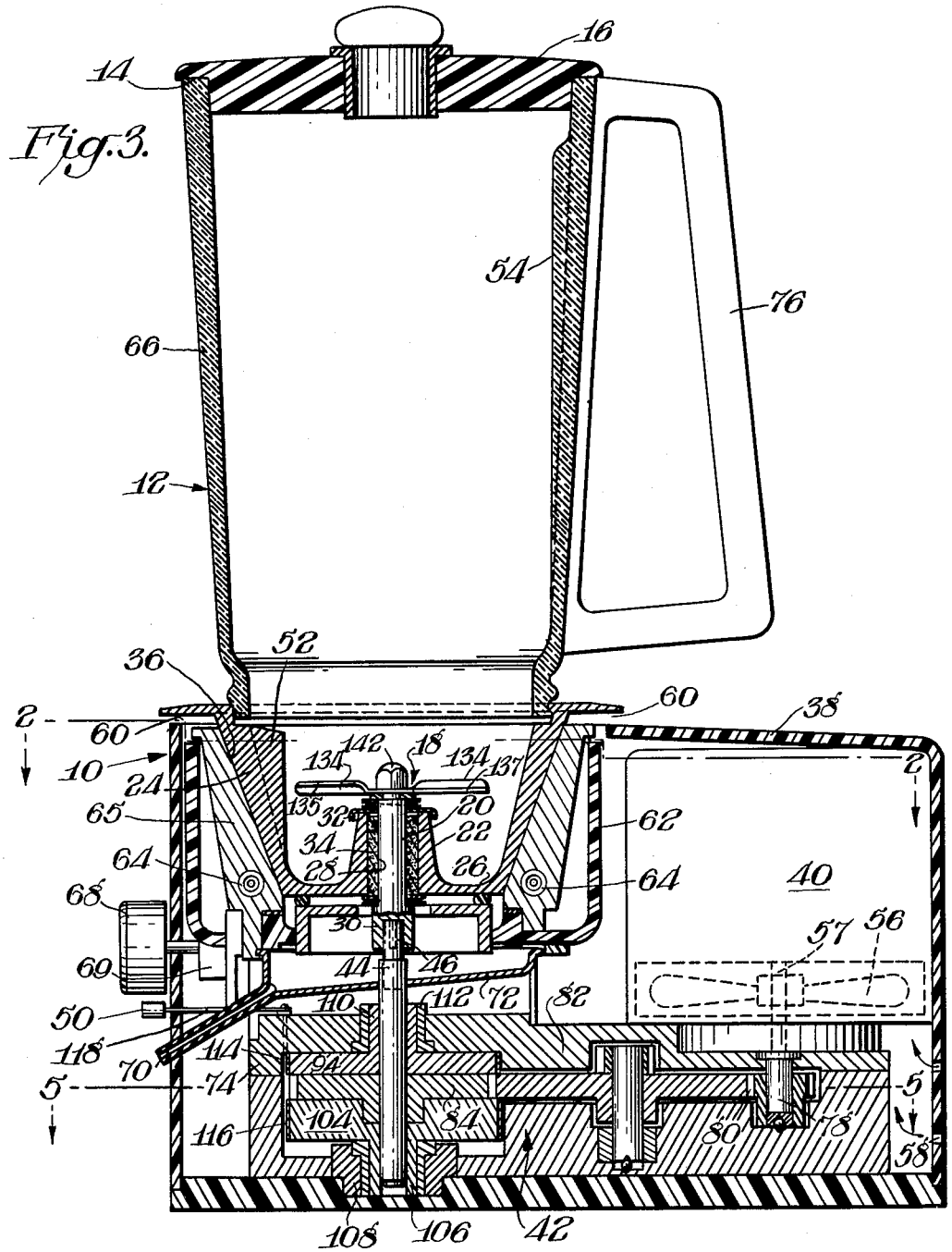

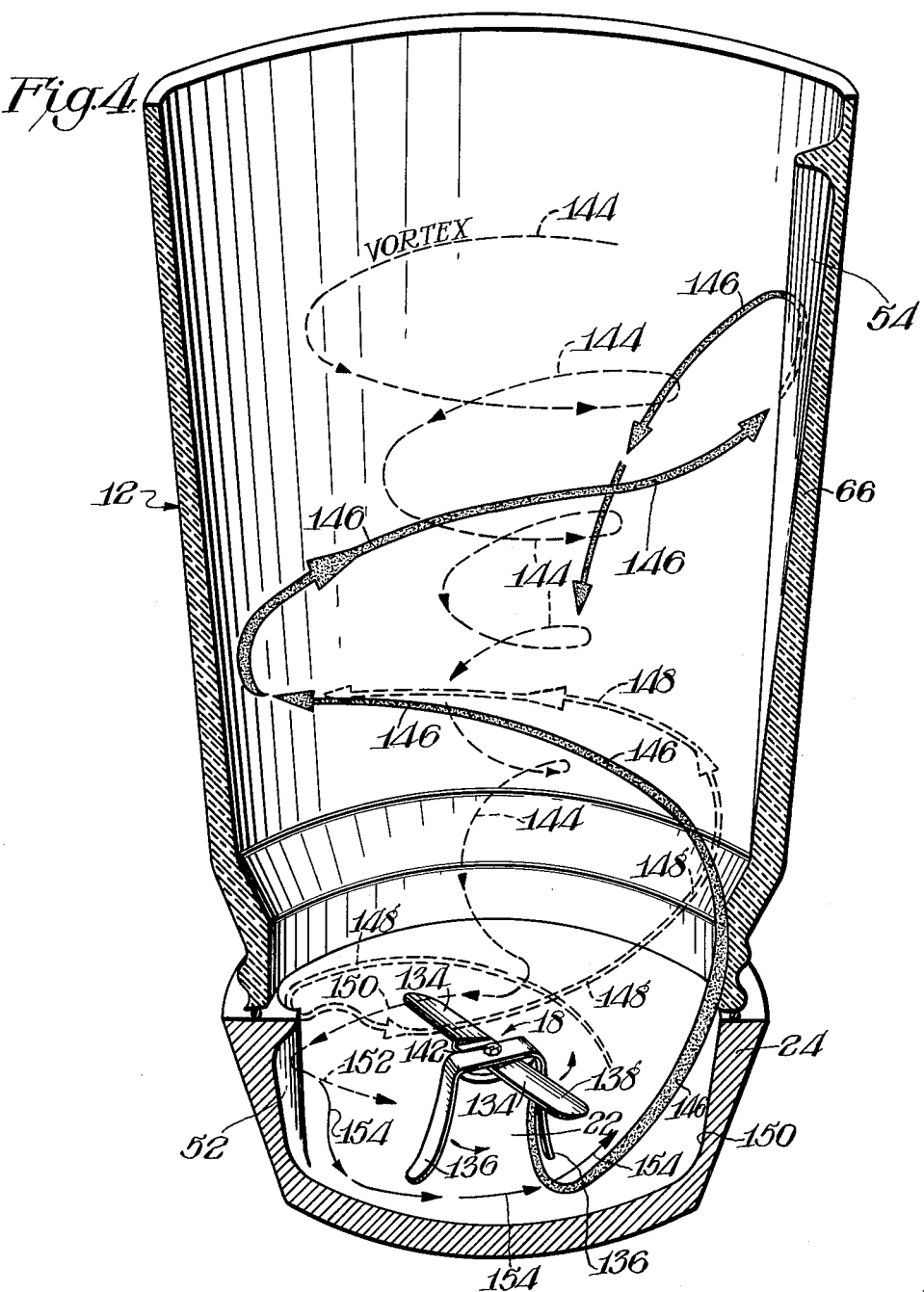

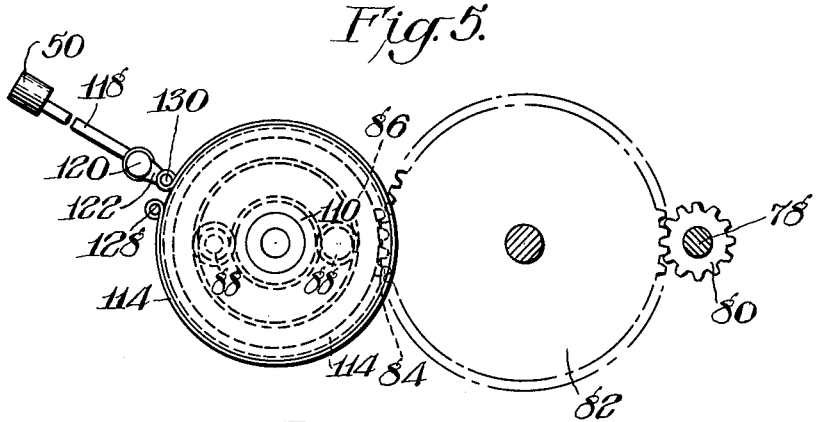

United States Patent Office 3,220,450
Patented Nov. 30, 1965

3,220,450
KITCHEN APPLIANCE
Louis V. Aronson II, Far Hills, N.J., and John W. Tone, Wilmington, Gustave A. Oberg, Claymont, and Marvin J. Nissman, Wilmington, Del., assignors to Ronson Corporation, Woodbridge, N.J., a corporation of New Jersey
Filed Dec. 26, 1961, Ser. No. 162,174
3 Claims. (Cl. 146—68)

This invention relates to novel modifications of an existing type of kitchen appliance known as a blender, and it more particularly relates to such modifications which greatly broaden the scope of utilization of a blender.

The conventional kitchen blender incorporates a set of blades driven at relatively high speeds in the range of thousands of r.p.m. through the bottom of a bowl for macerating solids and quasi-solids into pulps and liquids. Such blenders are accordingly very useful for preparing solid-containing drinks of all types such as fruit drinks and milkshakes and for preparing baby foods. These applications are fairly worthwhile, but the complexity of the required high speed mechanism makes such blenders a worthwhile investment only to a fairly restricted class of purchasers.

An object of this invention is to provide substantially simple and economical modifications of a kitchen blender that adapt it for performing a wide range of kitchen tasks both old and new.

In accordance with this invention the drive for the blender blades is made variable through a range including high macerating speeds ranging upwardly from approximately eight thousand r.p.m. and relatively low mixing speeds ranging approximately up to two thousand r.p.m. The blades themselves are made large enough and arranged to provide thorough mixing at relatively low speeds in addition to macerating by impact of their sharp edges in the relatively high blending speed range. This permits the resultant unit to be used for mixing an unprecedented variety of multiple ingredient concoctions such as sauces and soups as well as for the conventional drinking-mixing purposes. The variable speed drive for the blades is effectively provided by a variable speed motor in combination with a two-speed transmission which may be made compact and rugged in the planetary form. The fluid flow can be maintained smoothly circulating within the bowl of such a unit with minimum tendency to spill and splash by utilizing a pair of single substantially oppositely-arranged vertical ribs in the base and wall of the bowl.

The range of utility of such a unit is also remarkably expanded beyond any reasonable expectation by providing a source of heat in the base of the bowl which permits a remarkable variety of complete cooking operations to be carried out in one step in a single utensil in a time which is far less than any of comparable steps that could heretofore have been conducted separately. This unit also permits the performance for the first time of novel varieties of physical food preparation and heating which have no counterparts in pre-existing types of separately conducted preparation and cooking operations. This unit accordingly remarkably facilitates the preparation of sauces such as applesauce and remarkably facilitates the preparation of soups and whipped potatoes from the raw state. The heating element can be incorporated within the walls of a socket of a base housing that detachably receives the base of the bowl, and a drive motor within the base can be maintained cool by discharging air from the housing pumped into the housing by an impeller on the motor shaft out around an insulating ring mounted about the heating element.

Novel features and advantages of the present invention will become apparent to one skilled in the art from a reading of the following description in conjunction with the accompanying drawings wherein similar reference characters refer to similar parts and in which:

FIG. 3 is a cross-sectional view in elevation taken through FIG. 1 along the line 3—3;

FIG. 4 is a schematic perspective view of the fluid currents within the embodiment shown in FIGS. 1–3;

FIG. 5 is a fragmentary cross-sectional plan view taken through FIG. 3 along the line 5—5;

FIG. 6 is an exploded plan view of the gear transmission shown in FIGS. 3 and 5;

Figure 2:
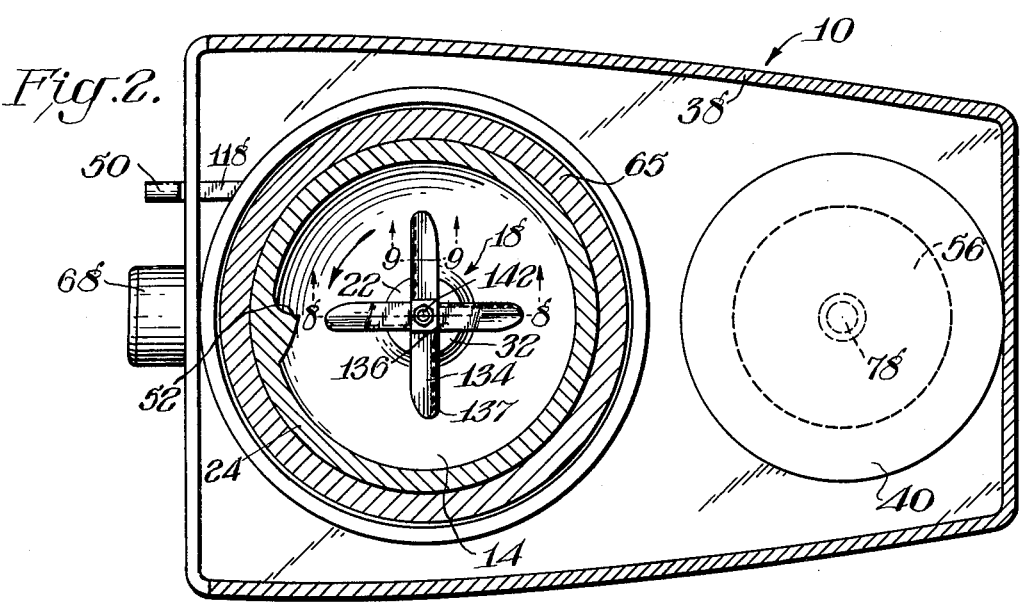
FIG. 2 is a cross-sectional plan view taken through FIG. 3 along the line 2—2.

FIG. 7 is a perspective view of the shifting arrangement for the transmission shown in FIG. 6; and FIGS. 8 and 9 are, respectively, cross-sectional views taken through FIG. 2 along the lines 8—8 and 9—9.

Figure 1:
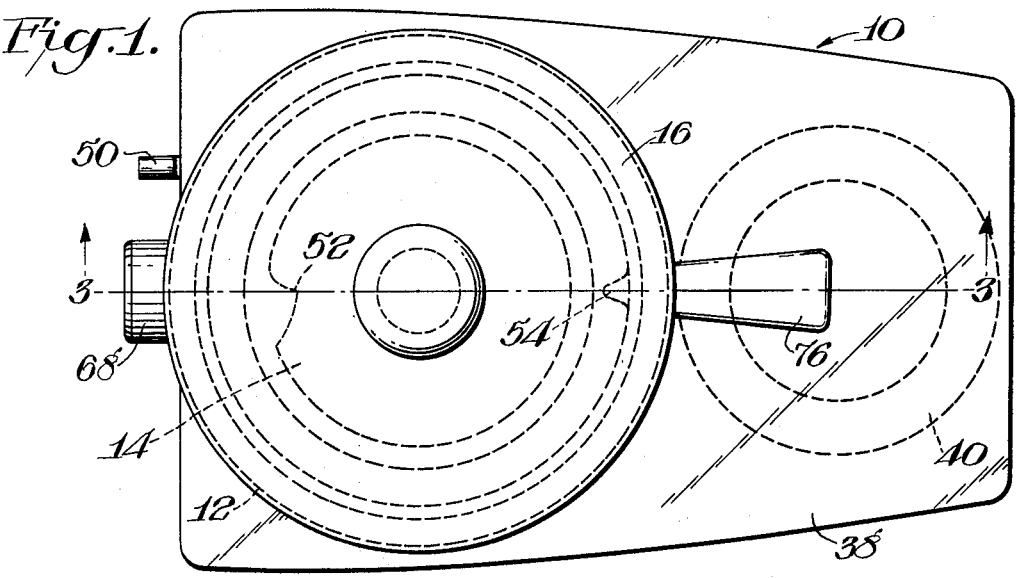
FIG. 1 is a top plan view of one embodiment of this invention.

In FIGS. 1–3 is shown a novel cooking appliance 10 which may roughly be described as a modification of a blender in which combination macerating and mixing blades are operable through a wide range of relatively higher macerating and relatively slower mixing speeds and in which provisions are made for introducing heat into the bowl. Unit 10 includes a bowl 12 having an open top 14 which is closed by a lid 16. A set of blades 18 are rotatably mounted upon a shaft 20 extending through a boss 22 in the base 24 of bowl 12. The bottom 26 of bowl 12 includes an aperture 28 through which the socket end 30 of shaft 20 extends. Suitable sealing means including an inverted disc 32 are provided for preventing liquid from dripping through aperture 28 along shaft 20. Shaft 20 is supported within a suitable recessed bearing 34, for example of the lubricant-impregnated type. Bowl 12 is detachably mounted within a socket 36 provided in the top of base housing 38. The walls of socket 36 and the outer circumference of base 24 of bowl 12 are correspondingly conically tapered to provide intimate engagement between them. However, the angle of the taper is made steep enough to prevent these parts from sticking together when either hot or cold.

A drive motor 40 is mounted within base housing 38 for rotating blades 18. Motor 40 is, for example, of the multiple speed multi-tap universal type; and it is connected through a transmission 42 to drive shaft 44, which is detachably connected with socket end 30 of shaft 20 through a keyed upper end 46. Transmission 42 includes, for example, a planetary gear stage 48 which can be shifted from one ratio to another through a gear shifting lever 50 and associated elements which are later described in detail. The combination of the variable speed motor and the gear shift permits the blades to be operated at a variety of speeds in two ranges, namely a high speed range varying from approximately 8,000–20,000 r.p.m. and a low speed range varying from approximately 800–2000 r.p.m. The 20,000 r.p.m. high speed is merely illustrative of a practically obtainable high speed, and it could be effective for blending if a higher speed equipment were available. The provision of five motor taps, for example, provides five separate speeds in each range.

As shown in FIGS. 3 and 4 bowl 12 incorporates a lower substantially vertical inwardly directed rib 52 and a similar upper rib 54 in its wall which are angularly displaced substantially opposite each other; and, for example, preferably displaced at 180° from each other for maintaining all of the fluid contents circulating in smooth patterns as described in detail in FIG. 4 whereby it is maintained in remarkably complete and smooth circulation within the bowl instead of splashing out of it.

The use of only a single rib about any given level of the bowl permits sufficient rotational speed to be imparted too the fluid to cause its impingement upon the ribs to positively force it to flow in relatively closed paths within the bowl.

An impeller 56 is mounted upon the shaft 57 of motor 40 for inducing air to flow inwardly through apertures 58 in base housing 38. This air is forced outwardly through circumferential aperture 60 about a ring of insulating material 62 disposed about heating element 64 within the walls of socket 36. Socket 36 is, for example, made in the form of a ring 65 of a heat conductive material such as aluminum for providing a substantial heat input to the base 24 of bowl 12. Base 24 of bowl 12 is also made of a heat conductive material such as aluminum, and the upper transparent section 66 of bowl 12, made of glass or plastic, is detachably secured to base 24 by being screwed within it. Heating element 64 is, for example, of the sheathed resistance type with, for example, a 750 watt rating. The flow of air outwardly from motor 40 through circumferential aperture 60 about insulating ring 62 made, for example, of a molded phenolic plastic facilitates the cooling of the motor and inner parts of the unit. A thermostat 69 operable by control lever 68 adjusts the temperature of heating element 64 and the amount of heat imparted to the interior and contents of bowl 12.

A spillage conduit 70 extends through base housing 38 from a sloped trough 72 mounted above the top of casing 74 enclosing gear transmission 42 for directing any liquids that may drip into socket 36 outside of base housing 38 to prevent any gumming-up of the interior of base housing 38. A convenient handle 76 is provided on the wall of upper portion 66 of bowl 12 for manipulating it.

In FIGS. 5-7 are shown details of planetary gear transmission 48 and its means of shifting from one ratio to the other. It accordingly includes a high speed stage 49 and a low speed stage 51. As shown in FIGS. 3 and 5, the drive from motor 40 is imparted from shaft 78 through pinion 80 and intermediate gear 82 to an external transmission driving gear 84 which is, for example, provided about the periphery of planetary high-speed spider cage or disc 86. Spider 86 is rotatably mounted about drive shaft 44; and a number of planetary gears 88, namely three in all, are rotatably mounted upon pins 90 on spider 86. A high-speed ratio sun gear 92 is secured to drive shaft 44 by pressing or silver soldering, and it is engaged with planetary gears 88 and internal ring gear 94.

Low speed ratio sun gear 96 is secured to the bottom of high speed spider 86, and it is engaged with low speed planetary gears 98 on pins 100 secured to low speed spider cage 102, which is secured to a lower portion of drive shaft 48 by silver soldering or brazing. The low speed ratio planetary gearing stage 51 is completed by internal ring gear 104 which engages planetary gears 98. The bottom stub shaft 106 of internal ring gear 104 is mounted within bushing 108 at the bottom of gear transmission casing 74, and upper stub shaft 110 is rotatably mounted within bushing 12 in the top of gear casing 74 with drive shaft 44 inserted through both of them.

High and low speed stages 49 and 51 are respectively activated by tightening of respective brake bands 114 and 116 about the peripheries of internal ring gears 94 and 104 by the shift lever 118 operated by control lever 50 shown in FIG. 3. Lever 118 is secured to a vertically mounted rotatable shaft 120 to which are secured cranks 122 and 124 respectively engaged with opposite ends of brake bands 114 and 116. Ends 126 and 128 of bands 114 and 116, which are remote from the connections 130 and 132 of these bands to cranks 122 and 124, are secured to fixed points in the casing. Rotation of lever 118 in opposite directions therefore alternately tightens and loosens upper and lower brake bands 114 and 116 to alternately shift from high to low ranges of speeds. Toggle spring 119 insures engagement of one stage or the other at all times. This form of gear transmission and shift is remarkably compact, dependable, and rugged in operation with minimum stresses imposed upon bearings and supports.

FIGS. 2, 8 and 9 describe the novel set of blades 18 which are effective throughout the wide range of relatively high macerating speeds and relatively low mixing speeds to provide effective macerating action and mixing action approximately in accordance with the flow circulation pattern shown in FIG. 4. The four blades of set 18 include a horizontal pair of blades 134 and a pair of downwardly diverted blades 136. The leading edges 138 of the upper blades are upwardly inclined or pitched for example 1/16 of an inch in a width of approximately 9/16 of an inch. Downwardly inclined blades 136 also include a positive angle of attack or pitch similar to that of the upper blades in conjunction with their counter-clockwise direction of rotation. A square key 140 fixes the centers of the blades to shaft 20 to which they are secured by nut 142 as shown in FIG. 3. Spring washers 143 and 145 resiliently control the vertical disposition of shaft 20. These blades provide remarkably effective mixing action at low speeds and macerating action at high speeds.

The flow diagram in FIG. 4 is substantially descriptive of the flow patterns existing over the entire range of speeds but it is more representative for higher speeds. As shown therein a central vortex spirals downwardly along the line 144 into the eye or entrance to blades 18.

After passing through blades 18, a substantial portion of the fluid reacts against the concave surface of base 24 of bowl 12 and is thereby diverted upwardly into an outer counterclockwise spiral 146. The substantially smooth upper wall 66 of bowl 12 allows spiral current 146 to have enough velocity when it strikes the larger upper portion of rib 54 to be diverted at its upper limit of travel over into the center of vortex current 144.

Blades 18 also impart a strong positive rotation to the fluid around the base 24 of bowl 12 along lines 148 and 150 until lower rib 52 is struck a forceable blow, which redirects part of current 150 inwardly into the blades. The other portion 154 of current 150 and current 148 are diverted into an outer counterclockwise spirals which are swept up within upwardly-directed spiral 146 at lower and upper portions of bowl 12 respectively. This joinder of currents is characteristic of the desired flow pattern in which various currents are forcefully directed from outer regions into the active blade region either directly or indirectly. This schematic representation of patterns of flow is greatly simplified for purposes of illustration, and is not intended to be exhaustive. It, however, does describe how blades 18 and bowl 12 with ribs 52 and 54 cooperate to provide remarkably smooth recirculating flow without any peripheral dead areas or strong pulsations which might cause splash or spillage. The use of diversionary ribs at only one portion of any peripheral level causes the circulating currents to impinge upon the indentation with sufficient velocity to direct them into desired smoothly circulating paths without material clashing which would disturb the enforced remarkably complete redirection of outer currents into the active central areas.

Operation of heating unit 64 embedded in cast aluminum socket ring 65, particularly in conjunction with variable speed operation of blade 18, provides new forms of cooking in a single utensil. For example, operation of blades 18 at a macerating speed of approximately 15,000 r.p.m. in combination with heat input permits whole raw potatoes to be mashed and cooked in a single operation in the remarkably short time of approximately eight minutes. Fine applesauce is completed from start to finish from large apple pieces in less time, such as six minutes. Cream sauces may be blended in the high speed range and then stirred in the low speed range to thoroughly cook them in remarkably short periods of time, with very little attention or skill required, to a perfect consistency. Any cooking which formerly required a double boiler can also be remarkably efficiently accomplished at heated slower rotational speeds, and the specially pitched blades provide remarkably effective and complete stirring action at slower mixing speeds. In addition, the heat input requirements by this unit are also remarkably lower than that required by any comparable separate cooking operations when they can at all be considered comparable. This unit can even be used as a deep fat fryer with or without agitation of the cooking oil by the mixing blades for browning more evenly, and it also remarkably facilitates the preparation of heretofore only difficultly prepared soups including a variety of ingredients with little danger of burning and minimum attention. All of these attributes and unexpectedly wide scope of usage more than repay the expense of the special features described herein, which heretofore would have been considered overwhelmingly disproportionate to the limited sphere of advantages that might have been foreseen for them by ordinary persons skilled in this art.

The aforementioned continuous circulation is facilitated by the taper of rib 54 from top to bottom which minimizes its effect upon lower circulating currents and makes it most effective in the upper portion of bowl 12. As shown in FIGS. 8 and 9, the chamfered front ends 135 and 137 of horizontal blades 134 and vertical blades 136 respectively improve their macerating action; and their positive rake cooperates with the positive pitch of the blades in improving their mixing and stirring action.

What is claimed is:

1. A blender comprising a bowl having an open top, a set of blades, rotatable drive means mounting said blades upon a vertical axis in the bottom of said bowl, the bottom of said bowl being apertured to permit said drive shaft means to extend through it, a base housing, a source of rotatable power within said base housing, said drive shaft means being connected to said source of rotational power, a first substantially vertically disposed inwardly-directed rib being provided in the base of said bowl adjacent said set of blades, a second inwardly-directed rib being provided in an upper portion of the wall of said bowl, said ribs being angularly spaced at substantially opposite orientations, and the remainder of the walls of said base and upper portion of said bowl being substantially unobstructed at any given level to permit the liquid swirling in said bowl to forceably impinge upon said ribs whereby it is maintained circulating within a closed path within said bowl.

2. A kitchen appliance comprising a bowl having an open top, a set of blades, rotatable drive shaft means mounting said blades upon a vertical axis in the bottom of said bowl, the bottom of said bowl being apertured to permit said drive shaft means to extend through it, a base housing, a variable-speed source of rotational power incorporated in said base housing providing a range of speeds for said set of blades ranging from relatively low mixing speeds up to approximately two thousand r.p.m. through relatively high macerating speeds ranging upwardly from approximately eight thousand r.p.m., said drive shaft means being connected to said source of rotational power, and said blades having sharp edges for macerating at said relatively high speeds and substantial areas for effecting thorough mixing at said relatively low speeds, a first substantially vertically disposed inwardly-directed rib being provided in the base of said bowl adjacent said set of blades, a second inwardly-directed rib being provided in an upper portion of the wall of said bowl, said ribs being angularly spaced at substantially opposite orientations, and the remainder of the walls of said base and upper portion of said bowl being substantially unobstructed at any given level to permit the liquid swirling in said bowl to forceably impinge upon said ribs whereby it is maintained circulating within a closed path within said bowl.

3. An appliance in accordance with claim 2 wherein four of said blades are provided, one opposed pair of said blades being substantially horizontally disposed, and the other opposed pair of said blades having portions thereof which are disposed in substantially vertical positions.

References Cited by the Examiner

UNITED STATES PATENTS

| 2,001,036 | 5/1935 | Prince | 74—768 |
|---|---|---|---|
| 2,109,501 | 3/1938 | Osius | 146—68.1 |
| 2,194,820 | 3/1940 | Connell et al. | 219—43 |
| 2,226,372 | 12/1940 | Cravaritus | 259—108 X |
| 2,278,125 | 3/1942 | Landgraf | 259—108 |
| 2,282,866 | 5/1942 | Hagen | 259—108 |
| 2,530,455 | 11/1950 | Forss | 259—111 X |
| 2,807,447 | 9/1957 | Vaughan | 239—105 |
| 2,822,485 | 2/1958 | Braun et al. | 259—108 |
| 2,905,397 | 9/1959 | DeAngelis et al. | 241—257 |
| 2,905,452 | 9/1959 | Appleton | 99—348 X |

FOREIGN PATENTS

| 684,774 | 3/1930 | France. |
|---|---|---|
| 912,409 | 5/1954 | Germany. |
| 1,023,866 | 2/1958 | Germany. |
| 9,416 | 1905 | Great Britain. |
| 17,779 | 7/1928 | Netherlands. |

OTHER REFERENCES

"Variac": "1955 Bulletin N," General Radio Company, Cambridge 39, Massachusetts, copyright 1955, 336–149 Lit. (16 pages) (copy available in Group 270).

ROBERT E. PULFREY, *Primary Examiner.*

JEROME SCHNALL, LAWRENCE CHARLES,
*Examiners.*